March 27, 1934.  G. M. KRIEGBAUM ET AL  1,952,503
SIDE CONNECTED IMPLEMENT FOR TRACTORS
Filed June 8, 1933  3 Sheets-Sheet 1

Inventors
George M. Kriegbaum
Clarence C. Haas

March 27, 1934. G. M. KRIEGBAUM ET AL 1,952,503
SIDE CONNECTED IMPLEMENT FOR TRACTORS
Filed June 8, 1933 3 Sheets-Sheet 3

Inventors
George M. Kriegbaum
Clarence C. Haas
By H.P. Doolittle Atty.

Patented Mar. 27, 1934

1,952,503

UNITED STATES PATENT OFFICE 1,952,503

SIDE CONNECTED IMPLEMENT FOR TRACTORS

George M. Kriegbaum and Clarence C. Haas, Richmond, Ind., assignors to International Harvester Company, a corporation of New Jersey Application June 8, 1933, Serial No. 674,934

4 Claims. (Cl. 97—47)

The present invention relates to tractor propelled side connected implements and more particularly to side connections for two row planters.

The main object of the invention is to provide a simple means for connecting two row planters, or similar implements, at one or both sides of a tractor in such a way that the planter will be held in parallel laterally spaced relation to the tractor body while remaining free to move or float vertically with respect to the tractor and to tilt laterally on its connection to the tractor. Other objects are to provide readily operable lifting and lowering means for a planter connected as stated, and also means for yieldably resisting upward floating movement thereof during operation.

The preferred embodiment of the invention is described hereinafter and illustrated in the accompanying drawings, where:

Figure 1:
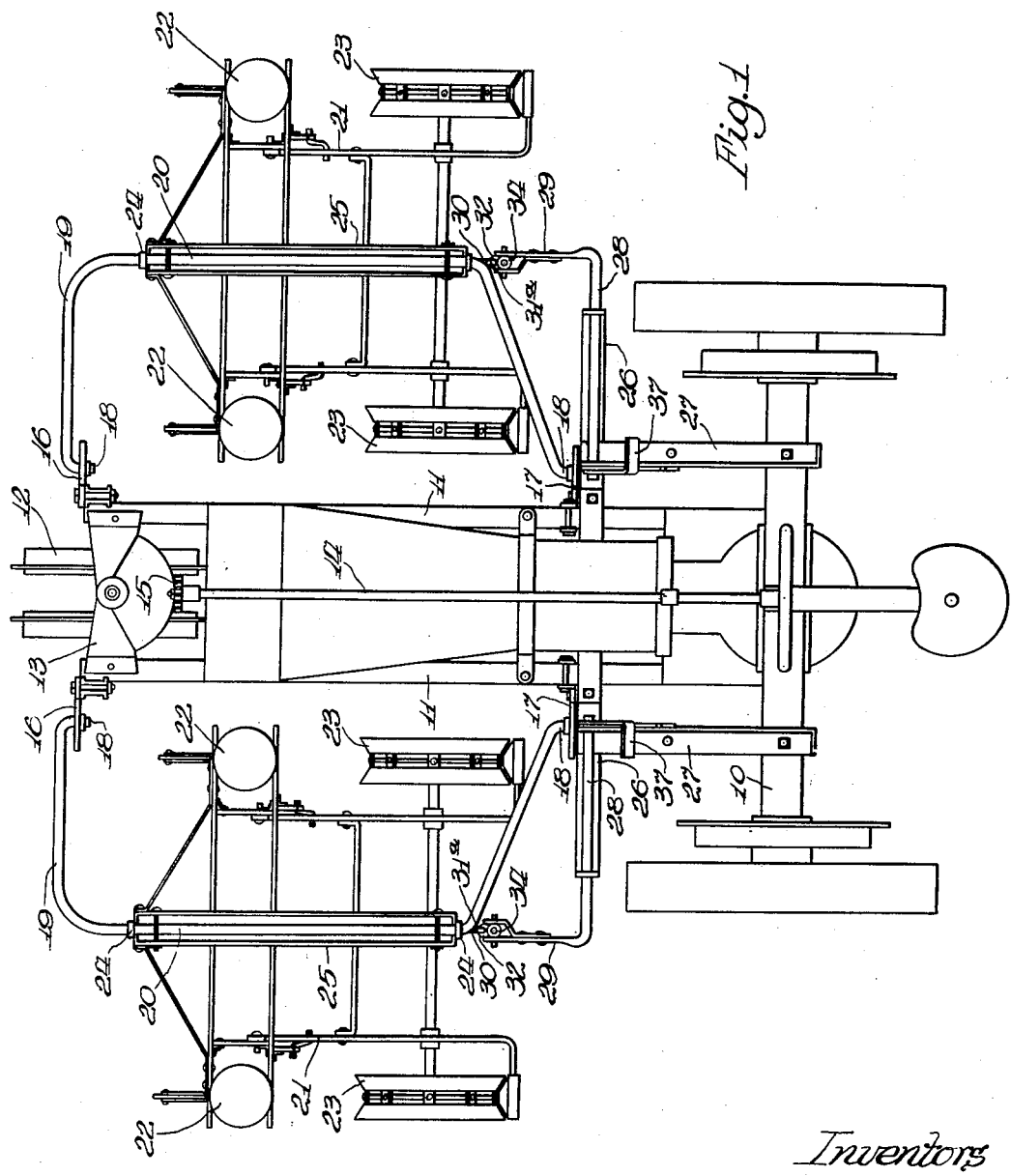
Figure 1 is a plan view of a tractor and planter organization embodying the invention.

The invention is disclosed in connection with a well known type of general purpose tractor, comprising a wide tread rear axle structure 10, a longitudinally extending body having side sills 11 on which the engine and related parts are carried, and a dirigible front truck 12 having a vertical shaft or standard journaled in a front bolster 13, connecting the front ends of the side sills 11. The truck is steered by means of a longitudinal shaft 14 having a steering wheel on its rear end adjacent the operator's station. Suitable gearing at 15 connects the shaft 14 to the upper end of the truck standard.

The combination illustrated includes two two-row planters, one of which is connected at each side of the tractor body with the two planters spaced from the body and from each other so as to provide equal spaces between the seed planting units. As the planter and the connecting structure, etc. at each side of the tractor are the same, description of one will suffice. With the particular tractor illustrated the side sill 11 is used for attachment of two longitudinally spaced bearing brackets. One bracket 16 is secured to the front end of the sill member 11 and the second bracket 17 is secured thereto near its rear end. These brackets are provided with aligned bearing openings in which are journaled the angularly bent pivot ends 18 of an outwardly extending bail-shaped connecting bar or member 19, the arms of which are angular extensions of a longitudinally extending straight portion 20 parallel to the axis of the pivots 18. The bail member 19 is thus connected to the side of the tractor body on a longitudinal axis parallel to the body. The two row planter comprises a horizontally extended frame 21, laterally spaced planting units 22, and supporting drive wheels 23 which serve also as covering wheels, as usual in planters of the type shown. The planter frames are located between the arms of the connecting member and beneath the straight outer portion 20 thereof, and the frame is connected on its central longitudinal line to the straight portion 20 by means of longitudinally spaced bearings 24 formed in the ends of a longitudinal member 25, forming a part of the planter frame. With the construction so far described it will be seen that the planter is free to tilt on the part 20 of the bail-shaped member as a pivot and that the planter and the bail-shaped member may float or move vertically about the axis of the pivots 18.

To provide for lifting and lowering the planter and for yieldably holding it in operation position the rear portion of the tractor is provided with a frame structure comprising a transverse member 26 secured to the sill members 11 and braced by rearwardly extending bars 27 connecting the member 26 with the rear axle structure. The projecting end of the member 26 is provided with suitable bearings for a rock shaft 28 which has a forwardly extending crank arm 29 in alignment with the central longitudinal line of the planter and of the outer portion 20 of the connecting member. The rear end of the planter is provided with a bracket 30 terminating in a short vertical post 31 bent at its upper end as at 31ª to form a stop. The post 31 is slidably received in a horizontal eye on the lower end of a lifting link 32 which is pivotally connected at its upper end to the crank arm 29 of the shaft 28. The connection between the crank arm 29 and the lifting link 32 includes a collar 33 pivoted on the end of the arm and slidable on the link 32 and retained thereon by a stop collar 34 on the upper end of the link.

A compression spring 35 is carried by the link 32 and is confined between the sliding collar 33 and a suitable stop 36 on the lower portion of the link. A hand lever 37 is secured to the inner end of the rock shaft 28 in convenient position to the operator's station.

Figure 2:
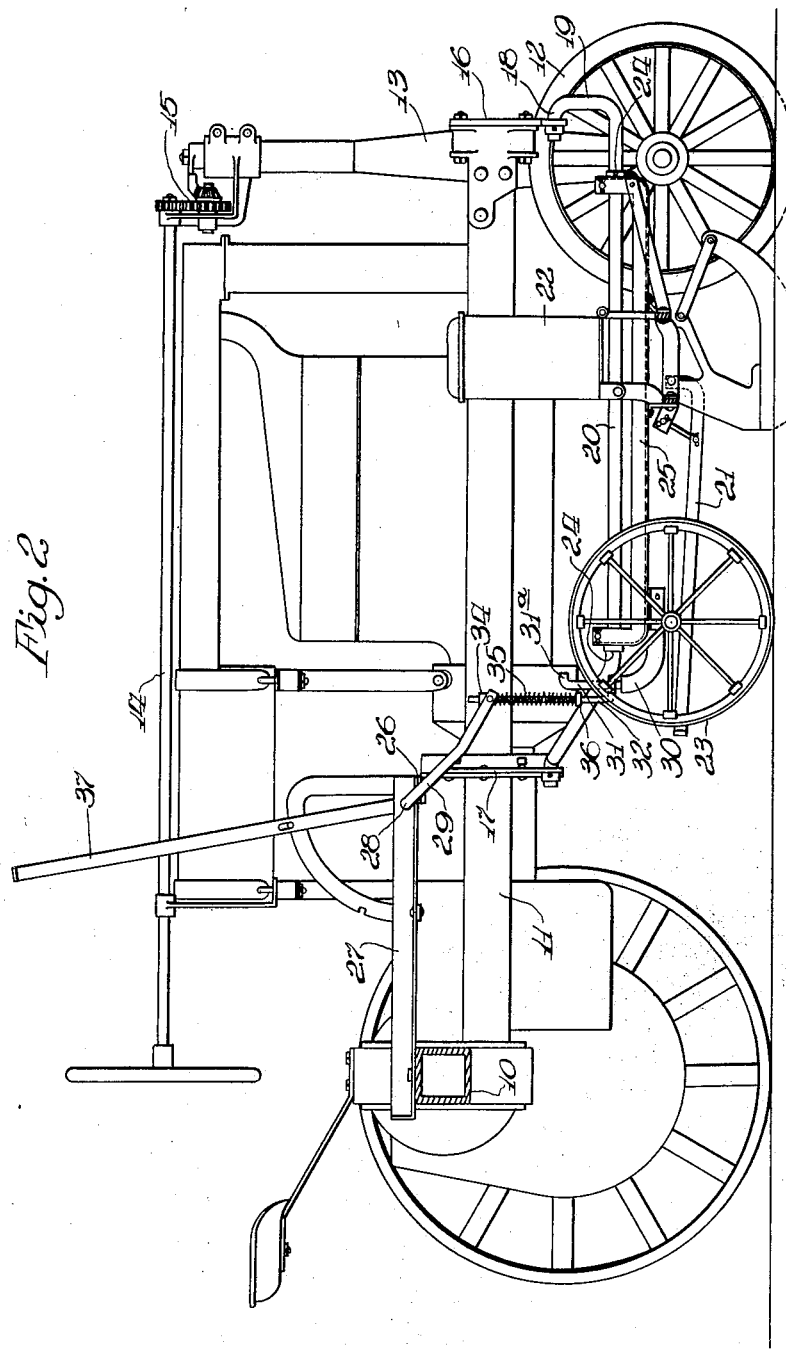
Figure 2 is a side elevation of the same.
Figure 3:
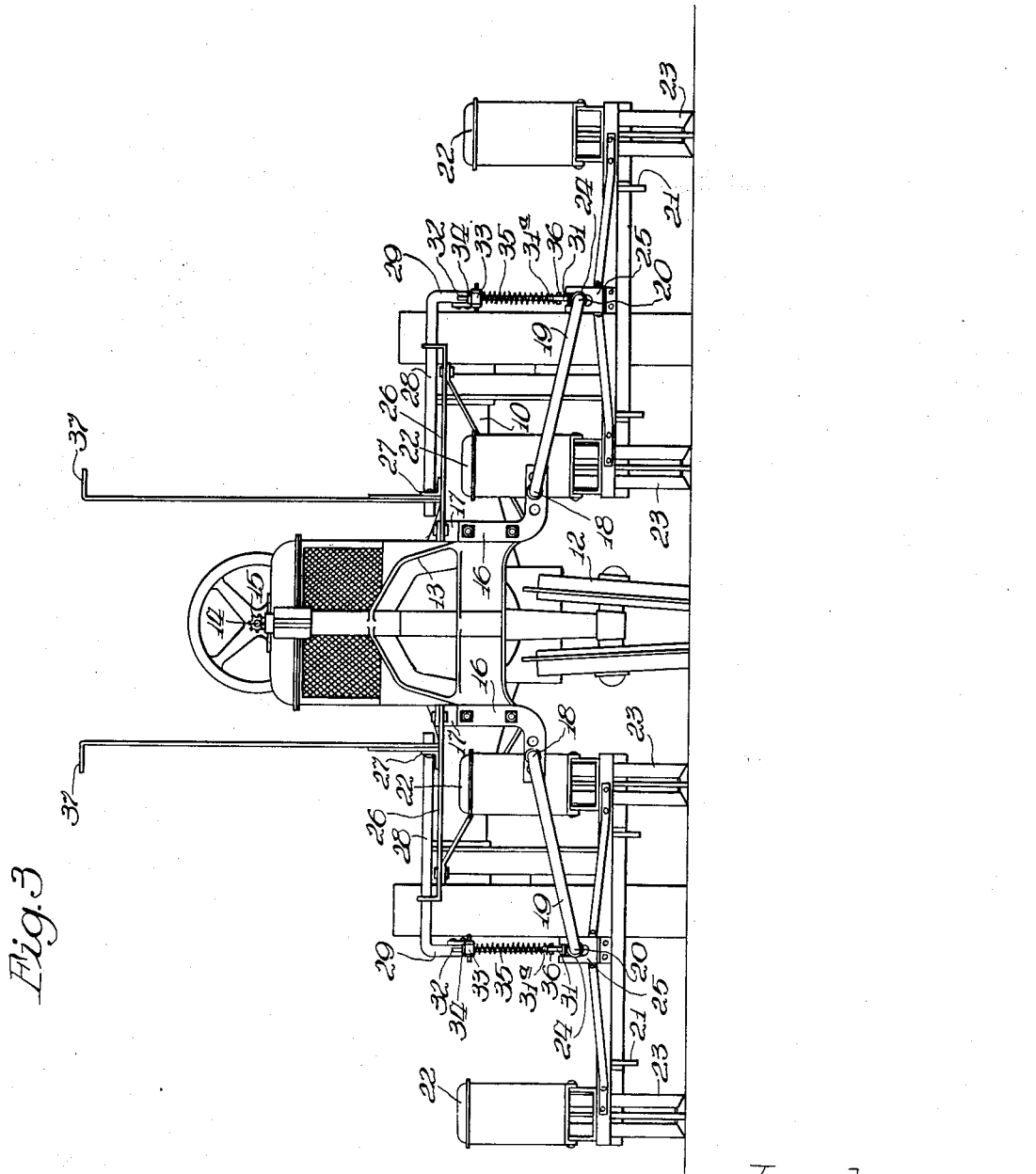
Figure 3 is a front view.

With the lifting connections illustrated, adjustment of the lever 37 when the planter is in lowered position, as in Figure 2, will either apply or release the pressure imparted to the planter by the spring 35. An extreme rearward movement of the lever 37 will cause the end of the link 32 to engage the stop 31ª on the upper end of the post 31, thereby swinging the planter and the bail-shaped connecting member upwardly clear of the ground for transport.

There has accordingly been provided a simple and efficient structure for connecting a planter at the side of a tractor body which structure positively retains the planter in parallel relation to the tractor body while permitting it to have such movements as are necessary to enable it to follow irregularities of the ground surface. The structure also provides lifting and lowering means which include means for applying yieldable pressure to the planter as may be found desirable to increase the traction thereof.

The preferred embodiment disclosed will, of course, be subject to modifications without departure from the scope of the invention as defined in the following claims.

What is claimed is:

1. The combination with a tractor having a longitudinally extended body, of means for connecting an implement frame in laterally spaced relation to the tractor body, comprising aligned bearing brackets secured to the side of the body in longitudinally spaced relation, a connecting member having an outer portion extending parallel to the tractor body and arms at the ends thereof pivotally connected on a longitudinal axis to the bearing brackets, and a horizontally extended implement frame located between said arms and pivotally connected on a central longitudinal axis to the outer portion of said connecting member.

2. The combination with a tractor having a longitudinally extended body, of means for connecting an implement frame in laterally spaced relation to the tractor body, comprising aligned bearing brackets secured to the side of the body in longitudinally spaced relation, a connecting member having an outer portion extending parallel to the tractor body and arms at the ends thereof pivotally connected on a longitudinal axis to the bearing brackets, a horizontally extended implement frame located between said arms and pivotally connected on a central longitudinal axis to the outer portion of said connecting member, a transversely extending rock shaft mounted on the tractor body having a crank arm positioned above the outer portion of said connecting member, a lost motion connection between said crank arm and the implement frame, and means on the tractor for rocking the shaft.

3. The combination with a tractor having a longitudinally extended body, of means for connecting a two row planter in laterally spaced relation to the tractor body, comprising two aligned bearing brackets secured to the side of the tractor body at the front end and rear portion thereof respectively, a connecting member consisting of a bail shaped bar having its arms pivoted to said brackets on a longitudinal axis and its outer portion extending parallel to the tractor body, a planter including a frame having planting units at each side thereof, aligned bearings mounted on said frame in spaced relation on the central longitudinal line thereof and rotatably receiving the outer portion of the bail shaped bar, and means on the tractor for yieldably depressing the planter.

4. The combination with a tractor having rear traction wheels and a body portion extending forwardly thereof, of a two row corn planter positioned at each side of the tractor body ahead of the traction wheels comprising a transversely extended frame having seed planting units on each side thereof, an outwardly extending bail shaped connecting member at each side of the tractor body having the arms thereof pivoted to the tractor body on longitudinal axes parallel to the longitudinal axis of said body, the outer portions of the bail shaped members connecting the arms being parallel to said axes, fore and aft spaced bearings on the respective planter frames located midway between the sides thereof in which the outer portions of the bail shaped members are journaled, and means on the tractor to raise and lower the planters and swing the bail shaped members.

GEORGE M. KRIEGBAUM.
CLARENCE C. HAAS.